R. F. Cook,
Fish Hook,
№ 13,081.      Patented June 19, 1855
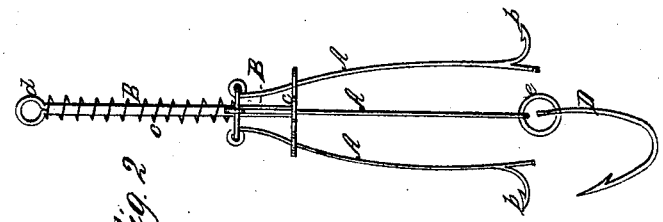
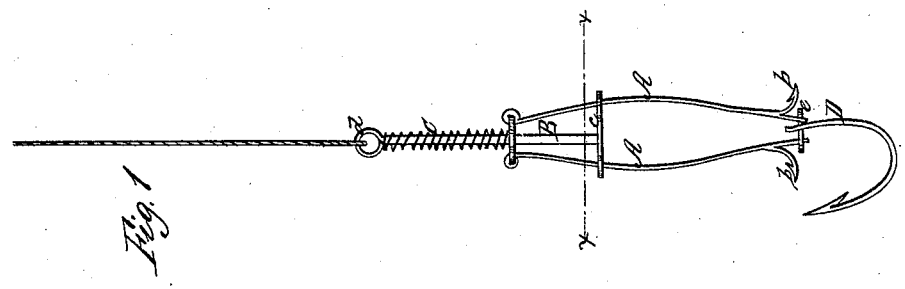

UNITED STATES PATENT OFFICE.

RICHARD F. COOK, OF TROY, ALABAMA.

IMPROVED FISH-HOOK.

Specification forming part of Letters Patent No. 13,081, dated June 19, 1855.

*To all whom it may concern:*

Be it known that I, RICHARD F. COOK, of Troy, in the county of Pike and State of Alabama, have invented a new and useful Improvement in Fish-Hooks; and I do hereby declare that the following is a full, clear, and exact description of the same, reference being had to the accompanying drawings, forming part of this specification, in which—

Figure 1 is an elevation of a fish-hook constructed after my invention and as set for use. Fig. 2 is a similar view of the same as it appears after being unset by a fish. Fig. 3 is a horizontal section through the dotted line *x x* in Fig. 1.

Similar letters of reference in each of the several figures indicate corresponding parts.

My invention relates to an improvement in that description of fish-hooks known as the "sockdolager," and used especially for catching large fish, and is designed to render the same more sure and certain in its action, or capable in every instance of catching and holding the fish securely the moment it takes the bait-hook and points of the spring barbs or hooks into its mouth and pulls slightly upon the same.

To enable others to fully understand my invention, I will proceed to describe it minutely.

A A A A represent four light steel strips or rods, made bow-shaped, so as to be elastic. These rods are attached loosely to a ring or plate, *a*, by their upper ends, and have barbs or hooks *b b* formed at right angles on them, near their lower ends, in the manner represented.

B is a small vertical rod passing down through the ring or plate *a*, between the strips or rods A A A A, and connecting fast with a horizontal plate or collar, *c*, which confines the strips A A A A, as shown in Fig. 3.

C is a spiral spring placed round the rod B, between the ring or plate *a* and the ring *d*, at the upper end of the rod B.

D is the bait-hook. It is connected to the lower end of one of the strips by a ring, *e*, and hangs a short distance below the barbs or hooks *b b*, as shown.

Operation: We will suppose the hook to be as shown in Fig. 2, and it is desired to set it ready for fishing, as shown in Fig. 1. The ring or collar *c* is moved down from the position shown in Fig. 2 to the position shown in Fig. 1, and held so by the elasticity of the strips. This causes the lower ends of the spring-strips A A A A to move close enough together to allow the ring *e* to be placed round them, as shown. The hook is now ready for use, and after being baited is let down into the water. In case a fish takes it into his mouth sufficiently far to bring the barbs or hooks *b b* between his jaws, and then pulls slightly upon the bait-hook D, it will be sprung, as shown in Fig. 2, or unset, and the barbs caused, by the action of the spiral spring C, to move laterally from each other, and consequently take into the top, bottom, and sides of the fish's mouth, and confine him securely, and thus relieve the bait-hook of nearly all the strain.

Having the lower ends of the steel strips carrying the barb-hooks move toward each other in setting the hook and from one another when the hook is sprung by a fish constitutes my invention, for by this arrangement I am enabled to bring the barbs into nearly as small a compass as that occupied by the bait-hook, and thus cause the fish to take them, with the bait-hook, into his mouth, and place himself under the immediate action of the barbs the moment the bait-hook is pulled slightly, whereas in other hooks only the bait-hook enters the fish's mouth, and very often the fish gets loose before the spring relief-hooks come in contact with him.

What I claim as my invention, and desire to secure by Letters Patent, is—

The combination and arrangement of the steel strips A A A A, having barbs *b* formed on them, collar or plate *c*, rod B, spiral spring C, ring *e*, and bait-hook D, substantially as and for the purposes set forth.

RICHARD F. COOK.

Witnesses:
BEASANT HALLEY,
WM. I. MCBRYDE.